(12) United States Patent
Kimura

(10) Patent No.: US 11,170,514 B2
(45) Date of Patent: Nov. 9, 2021

(54) IMAGE PROCESSING APPARATUS, IMAGE PROCESSING METHOD, 3D PRINTING SYSTEM, AND STORAGE MEDIUM

(71) Applicant: CANON KABUSHIKI KAISHA, Tokyo (JP)

(72) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 15/331,969

(22) Filed: Oct. 24, 2016

(65) Prior Publication Data
US 2017/0116740 A1   Apr. 27, 2017

(30) Foreign Application Priority Data

Oct. 27, 2015  (JP) .............................. JP2015-211106
Sep. 21, 2016  (JP) .............................. JP2016-184688

(51) Int. Cl.
*B29C 64/386*   (2017.01)
*G06T 7/40*   (2017.01)
(Continued)

(52) U.S. Cl.
CPC .............. *G06T 7/40* (2013.01); *B29C 64/386* (2017.08); *G06K 9/00228* (2013.01);
(Continued)

(58) Field of Classification Search
None
See application file for complete search history.

(56) References Cited

U.S. PATENT DOCUMENTS 6,803,910 B2   10/2004   Pfister et al.
6,831,641 B2   12/2004   Matusik et al.
(Continued)

FOREIGN PATENT DOCUMENTS

JP   2004-252935 A   9/2004
JP   2011-022796 A   2/2011
(Continued)

OTHER PUBLICATIONS

Title: Bi-directional Reflectance Distribution Function Web: https://web.archive.org/web/20150308051037/https://en.wikipedia.org/wiki/Bidirectional_reflectance_distribution_function Date: Mar. 8, 2015 (Year: 2015).*

(Continued)

*Primary Examiner* — Twyler L Haskins
*Assistant Examiner* — Wesley J Chiu
(74) *Attorney, Agent, or Firm* — Venable LLP

(57) ABSTRACT

An image processing apparatus includes a first acquiring unit capable of acquiring images of a plurality of view points, a second acquiring unit configured to acquire shape information of an object based on the images of a plurality of view points acquired by the first acquiring unit, a third acquiring unit configured to acquire material appearance information of the object based on a distribution of reflected light of the object obtainable from the images of a plurality of view points acquired by the first acquiring unit, and a generating unit configured to generate a file including the shape information of the object, the material appearance information of the object, and the images of a plurality of view points, acquired by the first to third acquiring units.

21 Claims, 9 Drawing Sheets

(51) Int. Cl.
*G06K 9/00* (2006.01)
*G06T 7/90* (2017.01)
*G06K 9/46* (2006.01)
*H04N 13/218* (2018.01)
*B33Y 30/00* (2015.01)
*B33Y 50/02* (2015.01)

(52) U.S. Cl.
CPC .............. *G06K 9/4661* (2013.01); *G06T 7/90* (2017.01); *H04N 13/218* (2018.05); *B33Y 30/00* (2014.12); *B33Y 50/02* (2014.12)

(56) References Cited

U.S. PATENT DOCUMENTS

| | | | | |
|---|---|---|---|---|
| 8,363,930 | B1* | 1/2013 | Francis, Jr. | G06K 9/00214 382/154 |
| 9,451,175 | B2 | 9/2016 | Kimura | |
| 2007/0110305 | A1* | 5/2007 | Corcoran | G06K 9/00228 382/167 |
| 2008/0084476 | A1* | 4/2008 | Toda | H04N 1/00278 348/207.2 |
| 2010/0110228 | A1* | 5/2010 | Ozawa | G06F 3/04883 348/231.2 |
| 2011/0007333 | A1* | 1/2011 | Ishii | H04N 1/60 358/1.9 |
| 2013/0004060 | A1* | 1/2013 | Bell | G01S 17/89 382/154 |
| 2013/0209600 | A1* | 8/2013 | Tow | G01N 35/1011 425/375 |
| 2014/0265034 | A1* | 9/2014 | Dudley | B33Y 10/00 264/401 |
| 2015/0036020 | A1* | 2/2015 | Shehane | H04N 9/8205 348/231.2 |
| 2015/0246488 | A1* | 9/2015 | Boettcher | G06T 11/203 264/40.1 |
| 2015/0268451 | A1* | 9/2015 | Wu | G02B 13/0015 348/46 |
| 2015/0381968 | A1* | 12/2015 | Arora | G06T 17/00 348/47 |
| 2016/0171748 | A1* | 6/2016 | Kohlbrenner | G01N 21/57 348/48 |
| 2016/0282811 | A1* | 9/2016 | Urbach | G03H 1/0465 |
| 2016/0282812 | A1* | 9/2016 | Urbach | G03H 1/0476 |
| 2016/0335781 | A1* | 11/2016 | Sano | B29C 64/129 |
| 2017/0046868 | A1* | 2/2017 | Chernov | H04N 13/221 |
| 2017/0072639 | A1* | 3/2017 | Levine | H04N 1/00827 |
| 2017/0085733 | A1* | 3/2017 | Ilic | G06T 19/20 |
| 2017/0368755 | A1* | 12/2017 | Bader | G05B 19/4099 |

FOREIGN PATENT DOCUMENTS

| | | |
|---|---|---|
| JP | 2014-039126 A | 2/2014 |
| JP | 2014-155008 A | 8/2014 |
| JP | 2015-095000 A | 5/2015 |

OTHER PUBLICATIONS

Title: Opacity (optics) Web: https://web.archive.org/web/20140817144310/https://en.wikipedia.org/wiki/Opacity_(optics) Date: Aug. 17, 2014 (Year: 2014).*

* cited by examiner

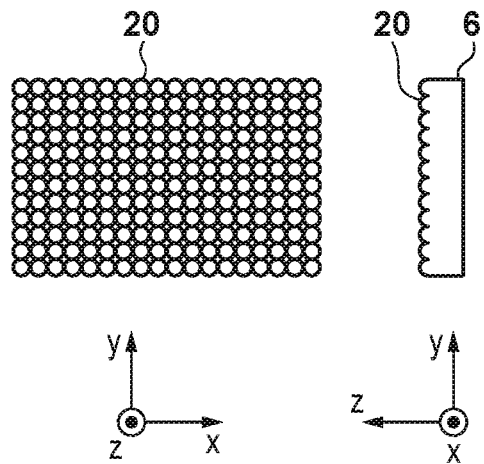
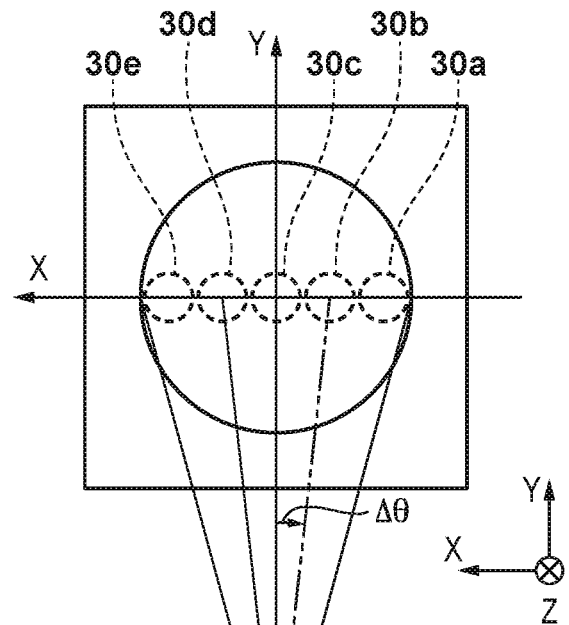
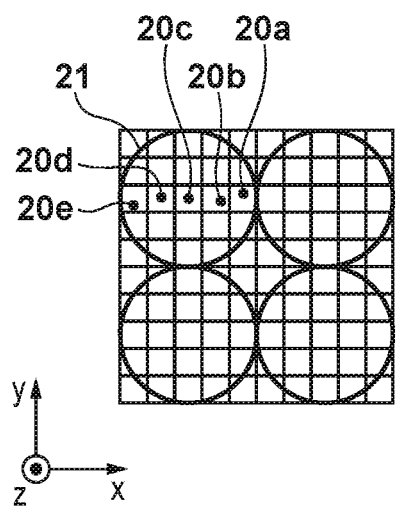
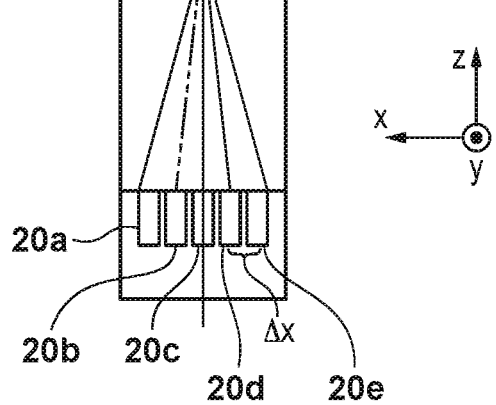

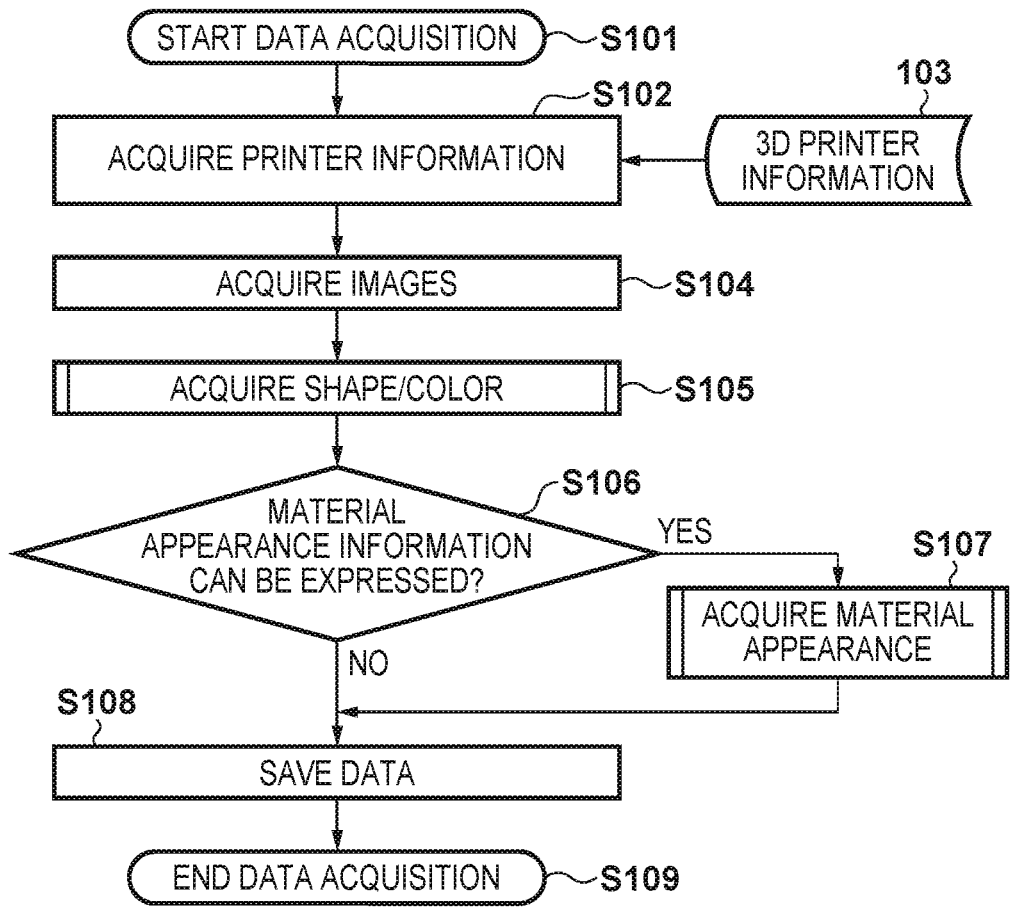
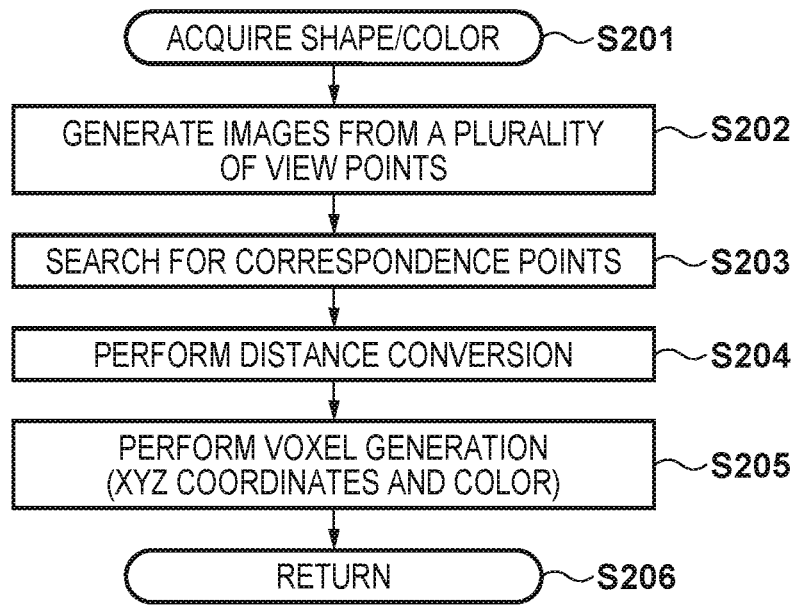

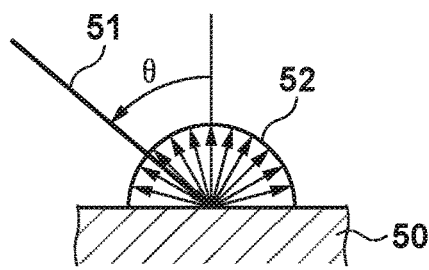
F I G. 4A
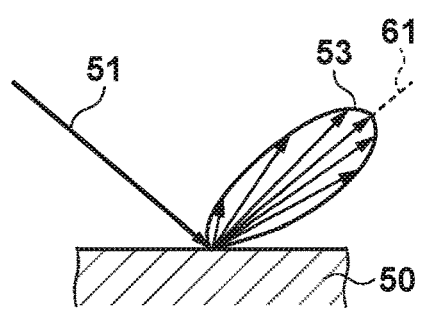
F I G. 4B
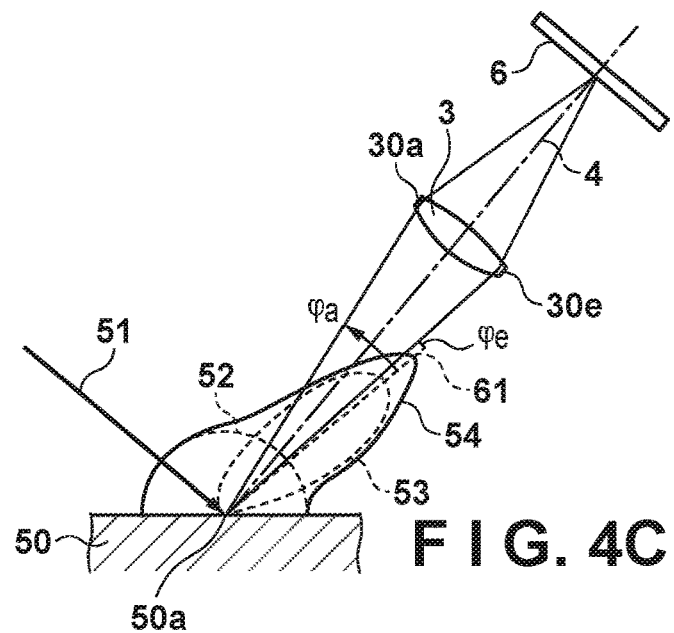
F I G. 4C
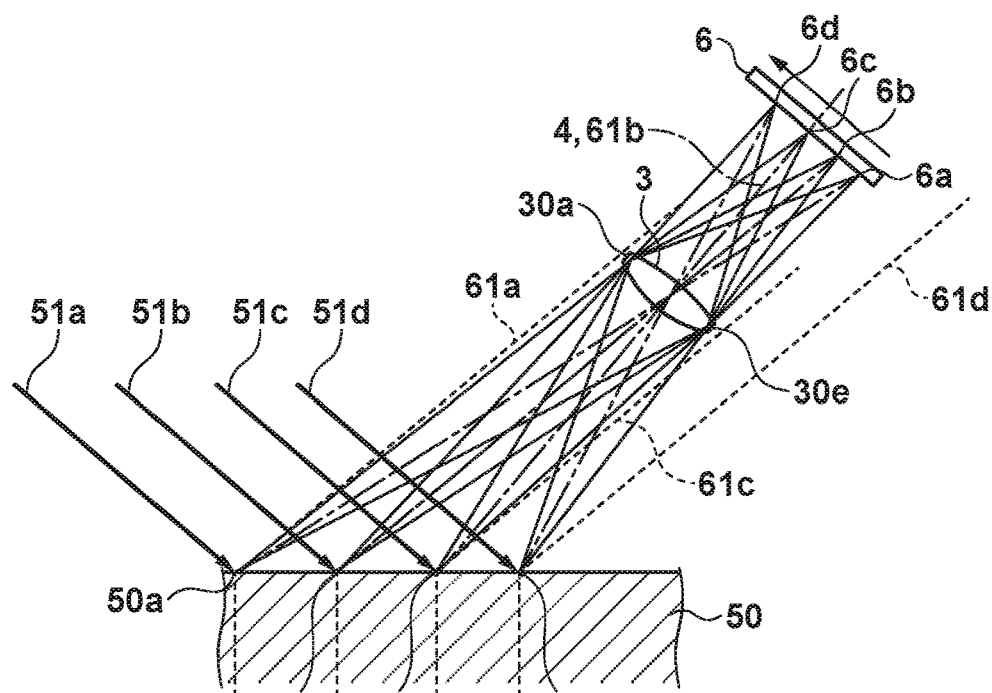
F I G. 4D FIG. 8A
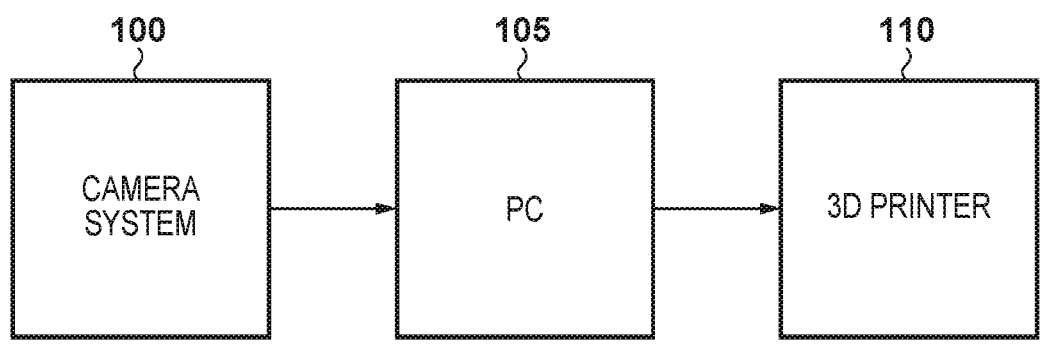
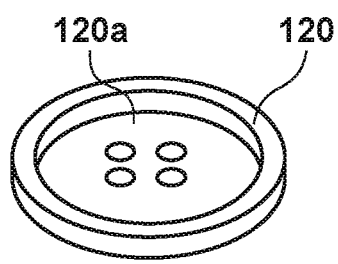
FIG. 8B
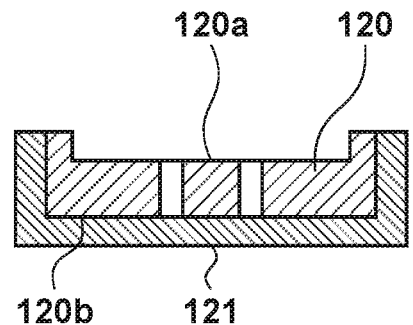
FIG. 8C
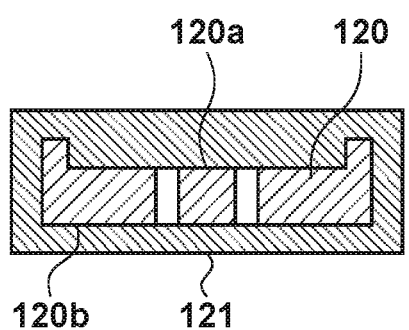
FIG. 8D
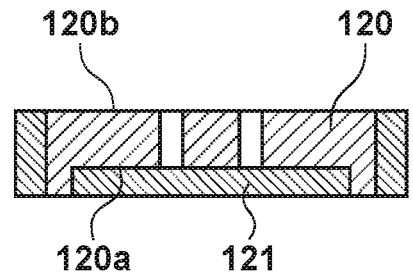
FIG. 8E

IMAGE PROCESSING APPARATUS, IMAGE PROCESSING METHOD, 3D PRINTING SYSTEM, AND STORAGE MEDIUM

BACKGROUND OF THE INVENTION

Field of the Invention

The present invention relates to an apparatus configured to acquire a three-dimensional shape of an object, and more specifically relates to an image processing apparatus configured to acquire information regarding a material appearance of an object using information from a plurality of view points.

Description of the Related Art

In recent years, with the development of 3D printer (three-dimensional shaping apparatus) technology, many technologies and products have also been proposed regarding cameras (so-called 3D scanners) capable of acquiring 3D information. Also, among 3D printers, products have also been proposed that, in order to shape an object that is close to reality, are capable of expressing information (for example, such as opacity, reflectance properties, or the like) broader than the shape or color of an object, which is generally referred to as material appearance information.

Japanese Patent Laid-Open No. 2004-252935 proposes an apparatus configured to acquire opacity using a 3D scanner capable of acquiring multi-view point information. Japanese Patent Laid-Open No. 2014-39126 proposes an image capturing system capable of acquiring material appearance information from a multi-view point image.

However, in the conventional technology disclosed in the above patent documents, there are the following problems. In the invention disclosed in Japanese Patent Laid-Open No. 2004-252935, it is difficult to obtain material appearance information other than opacity. Also, in the invention disclosed in Japanese Patent Laid-Open No. 2014-39126, a large number of parallax images are acquired over different times, so there are the problems that the apparatus cannot be applied to large-scale use, and cannot be applied to an object that moves.

SUMMARY OF THE INVENTION

The present invention was made in consideration of the above-described problems, and provides an image processing apparatus that, with a simple configuration, is capable of acquiring material appearance information of an object.

According to a first aspect of the present invention, there is provided an image processing apparatus, comprising: a first acquiring unit capable of acquiring images of a plurality of view points; a second acquiring unit configured to acquire shape information of an object based on the images of a plurality of view points acquired by the first acquiring unit; a third acquiring unit configured to acquire material appearance information of the object based on a distribution of reflected light of the object obtainable from the images of a plurality of view points acquired by the first acquiring unit; and a generating unit configured to generate a file including the shape information of the object, the material appearance information of the object, and the images of a plurality of view points, acquired by the first to third acquiring units.

According to a second aspect of the present invention, there is provided a 3D printing system, comprising: an image processing apparatus, comprising: a first acquiring unit capable of acquiring images of a plurality of view points, a second acquiring unit configured to acquire shape information of an object based on the images of a plurality of view points acquired by the first acquiring unit, a third acquiring unit configured to acquire material appearance information of the object based on a distribution of reflected light of the object obtainable from the images of a plurality of view points acquired by the first acquiring unit, and a generating unit configured to generate a file including the shape information of the object, the material appearance information of the object, and the images of a plurality of view points, acquired by the first to third acquiring units; and a 3D printer configured to perform printing based on information obtained from the image processing apparatus.

According to a third aspect of the present invention, there is provided an image processing method, comprising: first acquiring of acquiring images of a plurality of view points; second acquiring of acquiring shape information of an object based on the images of a plurality of view points acquired by the first acquiring; third acquiring of acquiring material appearance information of the object based on a distribution of reflected light of the object obtainable from the images of a plurality of view points acquired by the first acquiring; and generating a file including the shape information of the object, the material appearance information of the object, and the images of a plurality of view points, acquired in the first to third acquiring.

Further features of the present invention will become apparent from the following description of exemplary embodiments (with reference to the attached drawings).

BRIEF DESCRIPTION OF THE DRAWINGS

FIGS. 2A to 2C illustrate main portions of an imaging optical system of a camera system of an embodiment.

FIGS. 3A to 3D are flowcharts illustrating operation of the camera system of one embodiment.

FIGS. 4A to 4D illustrate reflection of light on an object and states of acquiring reflected light with an image capturing apparatus.

FIGS. 8A to 8E illustrate a shaping method in a 3D printer.

DESCRIPTION OF THE EMBODIMENTS

Figure 1A:
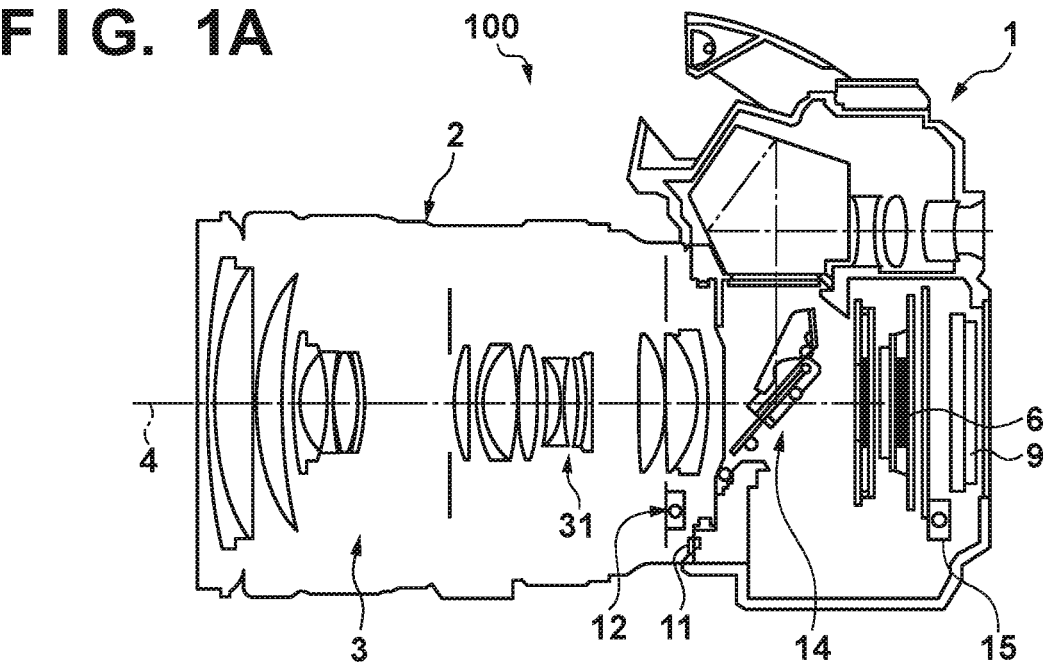
FIGS. 1A and 1B show the configuration of a camera system according to one embodiment of the invention.
Figure 1B:
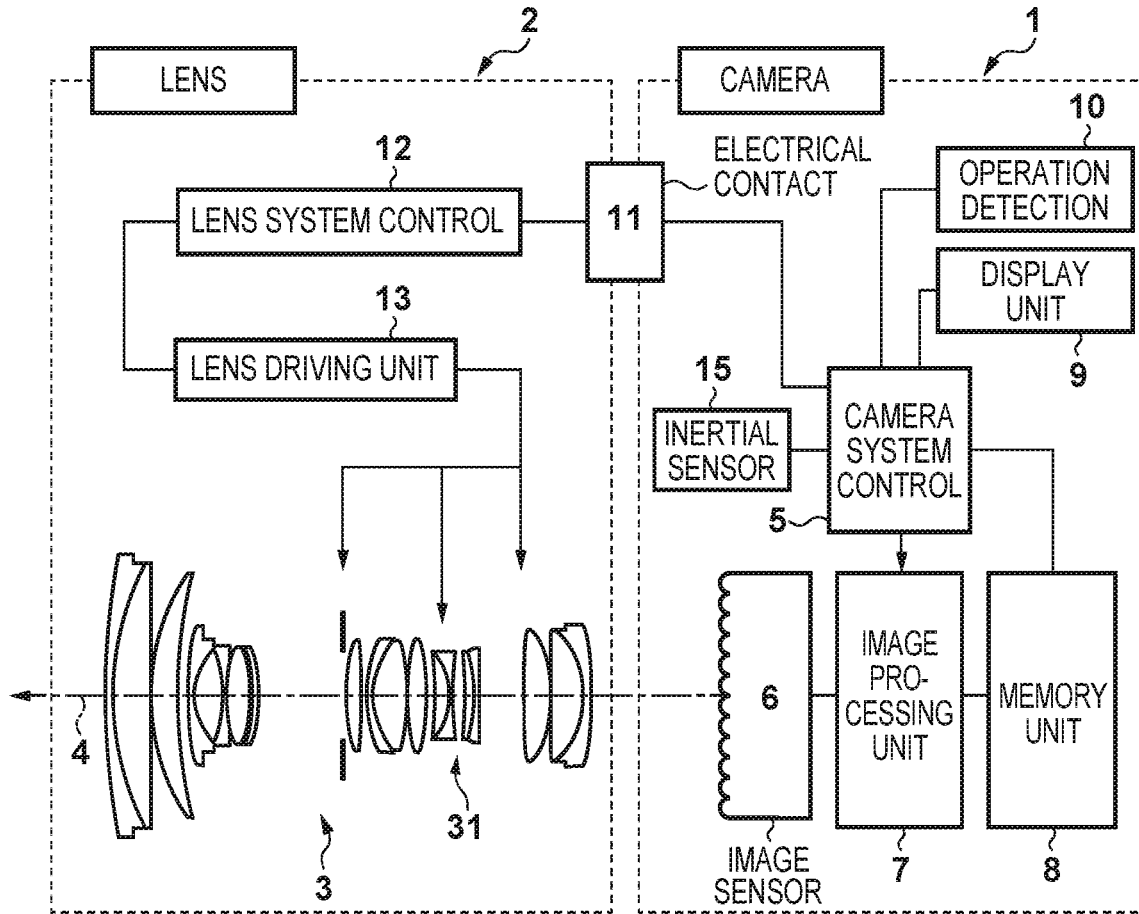

Below, an embodiment of the present invention will be described in detail with reference to the accompanying drawings. FIGS. 1A and 1B show the configuration of a camera system according to one embodiment of an image processing apparatus of the present invention, with FIG. 1A being a center cross-sectional view and FIG. 1B being a block diagram showing an electrical configuration. The camera system of the present embodiment is capable of acquiring information of the three-dimensional shape of an object, and therefore can also be called a 3D scanner.

In FIG. 1A, a camera system 100 is configured having a camera body 1, and a lens unit 2 that can be removably mounted to the camera body 1. The camera body 1 is provided with an image sensor 6, a quick-return mirror 14, a display unit 9, an electrical contact 11 of contact with the lens unit 2, and an inertial sensor 15. Also, the lens unit 2 is configured with an imaging optical system 3 composed of a plurality of lenses disposed along an optical axis 4. The lens unit 2 is provided with a lens system control circuit 12 configured to control the entire lens unit 2. In the present embodiment, a CMOS sensor, configured with a Bayer array in microlens units using RGB color filters, is adopted as the image sensor 6. However, the configuration of the image sensor 6 is not limited to this configuration.

In FIG. 1B, the camera body 1 is provided with a camera system control circuit 5, an image processing unit 7, a memory unit 8, an operation detection unit 10, and a display unit 9, as electrical blocks. Also, the lens unit 2 is provided with the lens system control circuit 12 and a lens driving unit 13, as electrical blocks.

The camera system 100 composed of the camera body 1 and the lens unit 2 is configured broadly divided into an image capturing unit, an image processing unit, a recording/playback unit, and a control unit. The image capturing unit includes the imaging optical system 3 and the image sensor 6, and the image processing unit includes the image processing unit 7. Also, the recording/playback unit includes the memory unit 8 and the display unit 9, and the control unit includes the camera system control circuit 5 and the operation detection unit 10, and the lens system control circuit 12 and the lens driving unit 13. The camera system control circuit 5 performs overall control of the entire system based on signals obtained from the camera body 1 and the lens unit 2. The lens driving unit 13 drives a focus lens 31, a shake correction lens, an aperture, and the like.

The image capturing unit forms light from an object into an image on an image capturing face of the image sensor 6 through the imaging optical system 3. Microlenses are disposed in the form of a grid on the surface of the image sensor 6, forming a microlens array (referred to below as an 'MLA'). Details of the function and disposition of the MLA will be described later with reference to FIGS. 2A to 2C. As described later, a focus evaluation amount and an appropriate exposure amount are obtained from signals of the image sensor 6, and the imaging optical system 3 is adjusted based on these signals. Thus, it is possible to expose object light of an appropriate light amount on the image sensor 6, and form an object image in the vicinity of the image sensor 6.

The image processing unit 7 internally has an A/D converter, a white balance adjustment circuit, a gamma correction circuit, an interpolation operation circuit, and the like, and generates an image for recording. A color interpolation processing unit is provided in the image processing unit 7, and generates a color image by performing color interpolation (demosaicing) processing on Bayer array signals obtained from the image sensor 6. Also, as functions described later, the image processing unit 7 has functions of performing signal sorting and generating images of differing view points, calculating a distance of an object corresponding to depth information from the images of differing view points, dividing into segments, and acquiring material appearance information, and the image processing unit 7 operates as an object information acquiring unit.

The memory unit 8 is provided with a processing circuit necessary for recording, in addition to an actual storage unit. The memory unit 8, along with performing recording, generates an image to be output to the display unit 9, and saves the image. Further, the memory unit 8 performs compression of still images, moving images, audio, and the like using a method determined in advance.

The camera system control circuit 5 generates and outputs a timing signal or the like used when performing image capturing. The image capturing unit, the image processing unit, and the recording/playback unit are respectively controlled in response to an external operation. For example, when pressing of an unshown shutter release button is detected by the operation detection unit 10, driving of the image sensor 6, operation of the image processing unit 7, compression processing of the memory unit 8, and the like are controlled. Further, display of an image by the display unit 9 is controlled.

Next is a description of an adjustment operation of the imaging optical system 3. The image processing unit 7 is connected to the camera system control circuit 5, and a focal position and an aperture position are obtained based on a signal from the image sensor 6. The camera system control circuit 5 outputs commands to the lens system control circuit 12 through the electrical contact 11, and the lens system control circuit 12 controls the lens driving unit 13. Further, an unshown hand-shake detection sensor is connected to the lens system control circuit 12, and in a hand-shake correction mode, a shake-correction lens is controlled through the lens driving unit 13 based on a signal of the hand-shake detection sensor.

Also, the camera body 1 is provided with the inertial sensor 15, so it is possible to measure the position and the attitude of the camera body 1. Therefore, it is possible to measure a difference in relative view points of successively shot images, for example.

FIGS. 2A to 2C illustrate main portions of the imaging optical system in the present embodiment. In the present embodiment, it is possible to acquire information (which can also be referred to as images of different parallaxes) of an incidence angle of light rays in addition to the position of light rays. In the present embodiment, a microlens array (referred to below as an 'MLA') 20 is disposed in the vicinity of an imaging plane of the imaging optical system 3 in order to acquire information of the incidence angle of light rays, and a plurality of pixels composing the MLA 20 are configured to correspond to a single lens.

FIG. 2A schematically shows the relationship of the image sensor 6 and the MLA 20. FIG. 2B is a schematic diagram showing the correspondence of pixels of the image sensor 6 to the MLA 20. FIG. 2C shows that pixels provided under the MLA 20 are associated with a specific pupil area by the MLA 20.

As shown in FIG. 2A, the MLA 20 is provided on the image sensor 6, and a front side main point of the MLA 20 is disposed so as to be in the vicinity of the imaging plane of the imaging optical system 3. FIG. 2A shows a state in which the MLA 20 is viewed from the front and from the side of the camera system 100, and when viewed from the front of the camera system 100, lenses of the MLA 20 are disposed so as to cover pixels on the image sensor 6. Note that in FIG. 2A, in order to more easily view each microlens composing the MLA 20, they are shown at a large size, but actually, each microlens is only approximately several times the size of a pixel. The actual size will be described with reference to FIG. 2B.

FIG. 2B shows a partial enlargement of the view from the camera front in FIG. 2A. The frame of the grid shown in FIG. 2B indicates each pixel of the image sensor 6. On the other hand, each microlens composing the MLA 20 is indicated with a thick circle 21. As is clear from FIG. 2B, a plurality of pixels are assigned to one microlens 21, and in the example in FIG. 2B, 25 pixels (5 rows×5 columns) are provided for one microlens 21. That is, the size of each microlens 21 is five times×five times the size of a single pixel.

The lower drawing in FIG. 2C shows a cross-section of the image sensor 6 in which the longitudinal direction of the image sensor 6, including the optical axis of one microlens, is shown in the horizontal direction in the drawing. Reference numerals 20a, 20b, 20c, 20d, and 20e in FIG. 2C each indicate a pixel (one photoelectric conversion unit) of the image sensor 6. On the other hand, the upper drawing in FIG. 2C shows an exit pupil plane of the imaging optical system 3. Actually, when directions are matched to the image sensor drawing shown in the lower drawing of FIG. 2C, the exit pupil plane is in a direction perpendicular to the paper face in FIG. 2C, but for ease of understanding the description, the projection direction is changed. Also, for ease of understanding the description related to FIG. 2C, projection and signal processing in one dimension will be described. In an actual apparatus, this can easily be expanded to two dimensions.

The pixels 20a, 20b, 20c, 20d, and 20e in FIG. 2C are in a positional relationship respectively corresponding to the pixels 20a, 20b, 20c, 20d, and 20e in FIG. 2B. As shown in FIG. 2C, each pixel is designed to be coupled to a specific area on the exit pupil plane of the imaging optical system 3 by the MLA 20. In the example in FIG. 2C, the pixel 20a corresponds with the area 30a, the pixel 20b corresponds with the area 30b, the pixel 20c corresponds with the area 30c, the pixel 20d corresponds with the area 30d, and the pixel 20e corresponds with the area 30e. That is, only luminous flux that passed through the area 30a on the exit pupil plane of the imaging optical system 3 is incident in the pixel 20a. This is similarly true for other pixels as well. As a result, it is possible to acquire angle information from the relationship between the area of passage on the pupil plane and the position on the image sensor 6. When considering an image in which, with respect to a plurality of the microlenses 21, only pixels in the same correspondence relationship as the pixel 20a that has captured only luminous flux that passed through the pupil area 30a are collected, and an image in which, with respect to a plurality of the microlenses 21, only pixels in the same correspondence relationship as a pixel (for example, the pixel 20e) that has captured only luminous flux that passed through a different pupil area (for example, the pupil area 30e) than the pupil area 30a are collected, these are images of differing view points. An image in which only pixels in the same correspondence relationship as the pixel 20a are collected is an image as viewed from the pupil area 30a, and an image in which only pixels in the same correspondence relationship as the pixel 20e are collected is an image as viewed from the pupil area 30e. That is, when one instance of exposure is performed and signals are appropriately sorted, it is possible to obtain a plurality of images of differing view points that were exposed with the same timing (a group of images of a plurality of view points).

Next, operation of the camera system 100, which functions as a 3D scanner capable of acquiring material appearance information, of the present embodiment will be described with reference to FIGS. 3A to 8E.

Figure 3C:
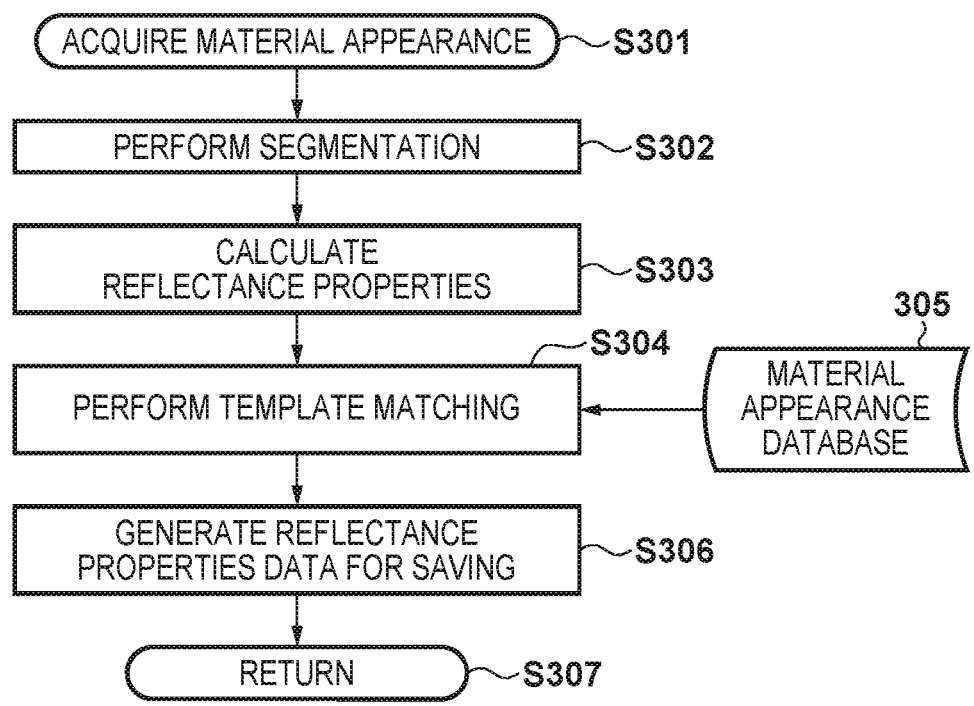
Figure 3D:
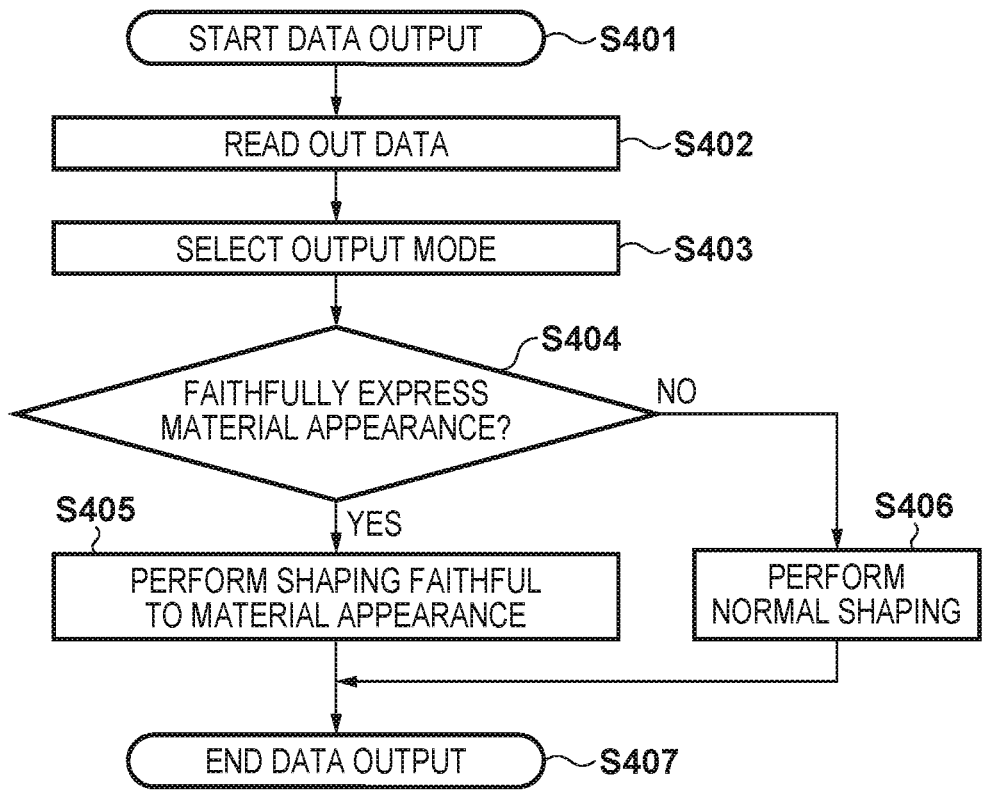

FIGS. 3A to 3D are flowcharts illustrating operation of the camera system 100 of the present embodiment. FIG. 3A is a flowchart illustrating a data acquisition operation in the camera system 100. FIG. 3B is a flowchart illustrating an operation to acquire shape and color. FIG. 3C is a flowchart illustrating a material appearance acquisition operation. FIG. 3D is a flowchart illustrating a data output (shaping with the 3D printer) operation.

FIG. 3A shows main portions of operation when acquiring the shape, color, and material appearance of an object using the camera system 100. First, in step S101, operation of the present embodiment is started. In the camera system 100, operation is started by pressing a release button that instructs image acquisition.

In step S102, information related to the 3D printer to output data is acquired. In this step, an item of data 103 that was set in advance by the user is preferably acquired. Also, the acquiring in step S102 may be performed by acquiring information of a 3D printer in a state connected to the camera system 100 or a personal computer (PC) 105 in a state connected to the camera system 100. There are many types of 3D printers, and the dimensions of information that can be expressed by the printer differ. Here, 'dimension' indicates, for example, three dimensions of shape only, dimensions additionally including RGB colors, and dimensions further including reflectance properties or opacity, referred to as material appearance. A most basic 3D printer can only express shape. In a case when output to this sort of 3D printer will be performed, it is preferably possible to acquire shape only. On the other hand, in a 3D printer capable of expressing reflectance properties, which are referred to as material appearance, it is necessary to acquire more information (details of the information will be described later). Information for determining and designating the information to be acquired is acquired in step S102. As information related to the 3D printer, specifically, for example, a printer ID, compatible file format, material appearance information type, printing method, and the like are conceivable. These items of information related to the 3D printer may be stored in advance in a memory, or may be acquired in step S102 by receiving the information from the 3D printer, in response to the camera system control unit 5 sending a request to the 3D printer through an unshown communication interface to send information related to the 3D printer.

In step S104, images are acquired. The optical system described with reference to FIGS. 2A to 2C is used, so in the camera system 100 in the present embodiment, it is possible to obtain images of a plurality of view points with one instance of exposure. Therefore, in step S104, data may be acquired in one instance of exposure, or a configuration may be adopted in which, by performing a plurality of instances of exposure to acquire a plurality of images, the number of view points is further increased and thus reflectance properties with more detail and greater accuracy are obtained. As another example in which a plurality of instances of exposure are used, there are cases where dynamic range is expanded. That is, among the items of information of the data 103 related to the 3D printer, when the tone that can be expressed is larger than the value of the camera system 100, it is possible to expand the dynamic range by performing a plurality of instances of shooting. Settings in a case where a plurality of instances of exposure are performed will be described later.

In step S105, a sub-routine for acquiring shape and color is called. Details of the sub-routine will be described later. In step S106, it is determined whether or not the 3D printer selected in step S102 can express material appearance information. When the selected 3D printer can express material appearance information, processing proceeds to step S107, and when the selected 3D printer cannot express material appearance information, processing proceeds to step S108.

In step S107, a sub-routine for acquiring material appearance is called. Details of the sub-routine will be described later. In step S108, data is saved. Here, data is recorded according to a format that has been determined in advance by a user, or according to the 3D printer in a state connected to the camera system 100 or the PC 105. In the present embodiment, the type or format of data to be recorded also can be set according to the output destination or user settings. For example, a format may be used in which information of a minimum necessary shape (voxel) for output (printing) of the 3D printer, and metadata are recorded in one file, or a format may be used in which, for compatibility with a printer capable of expressing material appearance information, acquired material appearance information is recorded in the same file. Recorded in the metadata are information related to the 3D printer of the output destination that has been set, the date and time of image capturing, information of the image capturing device and image processing and parameters used, an image developed for a thumbnail, and other information that is well-known as image file metadata. Regarding the material appearance information, representative values may be stored in the metadata, and for each area, in a similar format as the shape data, material appearance information may be stored in order after all of the shape data, for example. Also, in addition to the shape and material appearance information, original 2D image data may be recorded in the state of an undeveloped image (a RAW image), and may also be recorded in the same file as the image data after development. In the case of a format in which RAW images corresponding to a plurality of view point images are recorded, a format may also be adopted in which the plurality of view point images are stored in order in an image data portion in a DCF format, and the shape information is stored in a metadata portion. A configuration can be adopted in which, based on information related to the 3D printer, the shape information is converted from a voxel format to a format compatible with the 3D printer such as an STL format, and the shape information after conversion is stored. Also, the 2D image data may be associated and recorded in a separate file. In step S109, the data acquisition operation is ended.

Next, the sub-routine for acquiring shape and color will be described with reference to FIG. 3B. Step S201 is the start point when called from the main routine. In step S202, images of a plurality of view points are generated. As described with reference to FIGS. 2A to 2C, by appropriately sorting signals obtained by the image sensor 6 of the present embodiment, it is possible to obtain a plurality of images of differing view points that were exposed with the same timing. In step S202, this sorting is performed and images of a plurality of view points are generated. The positional relationship of relative view points of the images at this time is determined according to settings of the optical system in FIG. 2. In a case where images were further obtained by a plurality of instances of exposure, signal sorting of the respective images is performed to obtain images of differing view points, and based on a signal of the inertial sensor 15, information of the positional relationship of relative view points of the images is generated.

In step S203, a search is performed for correspondence points. A search is performed for points corresponding to the same object within the images viewed from the plurality of view points. Preferably, a focus area called a visual field frame is set, and searching is performed based on principles of a so-called phase-difference AF. The method of searching will be described later. Other methods are conceivable in which, for example, a suitable area is set as a template within one image and the same portion is searched in another image, or in which a feature point is extracted and a search for a corresponding feature point is performed.

In step S204, information of the optical system is acquired. The distance to an object is measured using the relative distance between view points and present focus information. In the optical system described with reference to FIGS. 2A to 2C, regarding an object (a so-called in-focus object) coupled to a main point of the microlens 20 by the imaging optical system 3, luminous flux emitted from the same object is incident on the same microlens regardless of the pupil area that the luminous flux passed through. On the other hand, regarding an object that is not in focus, luminous flux emitted from the same object is incident on a different microlens depending on the pupil area that the luminous flux passed through. An offset amount at this time corresponds to a focus offset amount, so this is used to calculate distance to the object. Details of this method will be described later.

In step S205, a voxel composed of distances in a predetermined width direction, a predetermined height direction, and a predetermined depth direction in an image is generated. A technique of generating three-dimensional shape information by voxels from a plurality of view point images in this way is well-known, and it is possible to use, for example, an SFM (Structure from Motion) technique as also disclosed in Japanese Patent Laid-Open No. 2015-95000. Because the distance was calculated in step S204, it is possible to obtain depth (Z) information for a shot image (position information in two dimensions related to an X, Y position and information related to color). Thus, a voxel, which is a three-dimensional pixel, is generated. In the present embodiment, color information is included as a voxel value, but color information is not absolutely necessary in the 3D printer that it the output target, and based on the information related to the 3D printer described above, the color information may be omitted. In step S206, processing returns to the main routine.

Next, the sub-routine for acquiring material appearance information will be described with reference to FIG. 3C. Step S301 is the start point when called from the main routine. In step S302, segmentation is performed to divide an image into a plurality of areas. An example of segmentation will be described later with reference to FIG. 6. In a case where segmentation is not performed, the following processing is performed for each voxel. The processing of steps S303 to S306 described below is performed for each area that was divided in step S302.

In step S303, reflectance properties are calculated for each area that was divided in step S302. The reflectance properties referred to here are one example of material appearance information, and a BRDF (Bidirectional Reflectance Distribution Function) or the like of an object corresponds to the reflectance properties. The BRDF is a function indicating how much light is reflected in an arbitrary direction when light is incident on an object. As described later with reference to FIGS. 4A to 4D, this function can be modeled as a diffusion component and a regular reflection component. A detailed BRDF acquisition method will be described later with reference to FIGS. 4A to 4D, and the like.

In step S304, template matching of material appearance information is performed. Information that best matches a pattern in a material appearance database 305 provided in a memory in advance is selected, and the selected information is used as the material appearance information of that area. In step S306, reflectance properties data for saving is generated. This data is saved with the information obtained in step S304, corresponding to each area or voxel. As another method, main object properties may also be recorded in metadata of a file. When this method is used, while greatly compressing data, the invention can be utilized in a simple material appearance presentation device. Material appearance properties (for example, such as a face of a person, described later) of an object that a user who uses the camera body 1 shoots with high frequency are preferably registered in the material appearance database 305. Also, in a case where a specific object was detected in an image using object detection technology by publicly-known template matching or the like using the camera system control unit 5 and the image processing unit 7, it is possible to use that information as assistance information in selection of material appearance information. For example, it is conceivable that when a target segment or voxel is an area where a face of a person was detected, the patterns used as matching targets are filtered to patterns for people, and by weighting a specific pattern, selection is facilitated. In step S307, processing returns to the main routine.

According to the operations described in FIGS. 3A to 3C, it is possible to acquire material appearance information as necessary (in accordance with properties of the output printer), and store data.

FIG. 3D is a flowchart showing operation when performing shaping using a 3D printer. Step S401 is the start of operation. In step S402, data acquired by the camera system 100 is read out. In step S403, an output mode is selected. As also described in operation when performing data acquisition, a 3D printer capable of expressing reflectance properties, which are called material appearance, also is proposed, and here settings to be used when printing are set. There are 3D printers provided with an auxiliary material of the shape, which is called a support material, and in such a product a face that contacts the support material is a matte (non-lustrous) face, and a face that does not contact the support material is a glossy (lustrous) face. Even in a case where a uniform shape is shaped in a final product, it is possible to control the matte face and the glossy face according to the disposition of the support material. This will be described later. In step S403, shaping following the intent of the user is instructed in consideration of the intended use, shaping time, cost, and the like.

In step S404, it is determined whether or not to express the material appearance. In a case of expressing the material appearance, processing proceeds to step S405, and in a case of not expressing the material appearance, processing proceeds to step S406. As another selection method in step S404, switching may be performed according to the type of camera body. That is, a configuration may be adopted in which, in a case where data was acquired with a camera body capable of acquiring material appearance information, processing proceeds to step S405 where the material appearance is expressed, and when not such a case, processing proceeds to step S406. In step S405, shaping faithful to the material appearance is performed. In a 3D printer that controls the material appearance of the output face according to the presence of the above-described support material, shaping as faithful to the material appearance as possible is performed by optimizing a layering direction or the location where the support material is used. In step S406, shaping is performed without regard to the material appearance, and shaping is performed by a method optimized for the shaping time, cost, and the like. In step S407, the shaping operation, which is a data output operation, is ended. According to the operation described in FIG. 3D, material appearance information is output as necessary (in accordance with intent of the user), and an appropriately shaped object is obtained.

Next is a description of states of reflected light with reference to FIGS. 4A to 4D. FIG. 4A shows a state of diffuse reflected light in a case where an object is a Lambert face. FIG. 4B shows a state of mirror face reflected light. FIG. 4C schematically shows how light rays including diffuse reflected light and mirror face reflected light can be captured with the camera system 100. FIG. 4D shows how a state of parallel light hitting an object can be captured with the camera system 100, and shows a state of signals at that time.

In FIG. 4A, reference numeral 50 indicates an object, reference numeral 51 indicates a light ray, and reference numeral 52 indicates diffuse reflected light. Also, in FIG. 4B, reference numeral 53 indicates mirror face reflected light, and reference numeral 61 indicates a regular reflection direction of the light ray 51. The reflection model described below is based on a so-called dichromatic reflection model (see 'Digital Image Processing' by CG-ARTS Society, P. 281, etc.).

First, diffuse reflection is considered. Diffuse reflected light is often modeled with reflection so as to be completely irregular reflection, and is called Lambert reflection. A face that reflects in this way is called a Lambert face. FIG. 4A shows reflectance properties modeled with a Lambert face, and reference numeral 52 indicates an envelope of intensity of reflected light in order to show a state in which reflection is uniform in each direction in an easily understood manner. The luminance of the diffuse reflected light does not change with the direction of viewing. This is described in a formula as follows.

$$Ld(\lambda)=Ie(\lambda)Kd(\lambda)\cos\theta \quad (1)$$

Here, $Ld(\lambda)$ represents the luminance of diffuse reflected light, $Ie(\lambda)$ represents the luminance of a light source, $Kd(\lambda)$ represents diffuse reflectance properties, $\theta$ indicates an incidence angle, and $\lambda$ indicates wavelength.

Next, mirror face reflection is considered. Many models have been proposed for mirror face reflected light. Here, a Phong model often used in CG or the like is given as an example, but another model may also be used. FIG. 4B shows reflectance properties modeled with the Phong reflection model, with a strong peak in the normal reflection direction 61 of the light ray 51, and sudden attenuation when the angle changes. Reference numeral 53 indicates an envelope of intensity of reflected light in order to show a state in which reflected light changes according to the direction of observation, in an easily understood manner. This is described in a formula as follows.

$$Ls(\lambda)=Ie(\lambda)(\cos\varphi)^n \quad (2)$$

Here, $Ls(\lambda)$ represents the luminance of mirror face reflected light, $\varphi$ represents an angle formed by the normal reflection direction and the observation direction, and n represents a constant determined according to properties of the object.

Because a synthesis of the above-described mirror face reflected light and diffuse reflected light is observed, a case of observing from an arbitrary view point p is described in a formula as follows.

$$L(\lambda) = Ld(\lambda) + Ls(\lambda) \quad (3)$$
$$= Ie(\lambda)Kd(\lambda)\cos\theta + Ie(\lambda)(\cos\varphi p)^n$$

Here, $L(\lambda)$ represents the luminance of reflected light in which diffuse reflected light and mirror face reflected light are combined, and φp represents an angle formed by the normal reflection direction and the view point p.

Next is a description of states of light rays captured with the camera system 100 of the present embodiment, with reference to FIG. 4C. In FIG. 4C, reference numeral 3 indicates the imaging optical system, reference numeral 4 indicates the imaging optical axis, reference numeral 6 indicates the image sensor, and reference numerals 30a and 30e indicates specific pupil areas of the imaging optical system 3 corresponding to FIG. 2C. Also, reference numeral 54 indicates reflected light in which diffuse reflected light and mirror face reflected light are added, reference sign φa indicates an angle formed by the pupil area 30a and the normal reflection direction 61, and reference sign φe indicates an angle formed by the pupil area 30e and the normal reflection direction 61.

The camera system 100 is observing a complex luminance distribution 54 in which diffuse reflected light and mirror face reflected light are combined as shown in FIG. 4C. At this time, regarding luminous flux that passes through the pupil area 30e, the angle formed with the normal reflection direction 61 is small, and regarding luminous flux that passes through the pupil area 30a, the angle formed with the normal reflection direction 61 is large. That is, according to formula (3), when luminous flux that passes through the pupil area 30a is compared to luminous flux that passes through the pupil area 30e, the same amount of diffuse reflected light is included, but the intensity of mirror face reflected light is different. On the other hand, the camera system 100 of the present embodiment has a configuration in which luminous flux can be acquired with the pupil passage areas being sorted.

An actual shooting circumstance will be described in more detail with reference to FIG. 4D. In FIG. 4D, reference numerals 50a, 50b, 50c, and 50d indicate points on the object 50, and reference numerals 6a, 6b, 6c, and 6d indicate points on the image sensor 6 that respectively correspond to the points 50a, 50b, 50c, and 50d on the object 50. Also, reference numerals 51a, 51b, 51c, and 51d indicate light rays incident on the points 50a, 50b, 50c, and 50d, and reference numerals 61a, 61b, 61c, and 61d indicate lines showing the normal reflection direction of the light rays 51a, 51b, 51c, and 51d. Further, reference numerals 152a and 152e indicate luminance of signals that passed through the pupil areas 30a and 30e, reference numeral 153 indicates luminance on the point 50c that passed through the pupil area 30a, reference numeral 154 indicates luminance on the point 50c that passed through the pupil area 30e, and reference numeral 155 indicates the level of diffuse reflected light.

FIG. 4D shows how parallel light hits the object 50, and image capturing of that reflected light is performed. Although omitted from the description of FIG. 4C, reflected light of various locations of an object forms an image on the image sensor 6. For example, in FIG. 4D, the points 50a, 50b, 50c, and 50d on the object 50 respectively correspond to the points 6a, 6b, 6c, and 6d on the image sensor. In the example shown in FIG. 4D, for ease of understanding the description, focus of the imaging optical system 3 is established on the object 50. That is, a point on the object side is formed as an image at the same position on the image sensor, regardless of the pupil passage area. On the other hand, in a case where focus of the imaging optical system 3 is not established on the object 50, the position where an image is formed on the image sensor shifts depending on the pupil passage area.

Signals obtained in this sort of circumstance are shown in the lower part of FIG. 4D. Reference numeral 152a indicates a signal that passed through the pupil area 30a, and reference numeral 152e indicates a signal that passed through the pupil area 30e. Here, the diffuse reflected light level 155 of the object corresponds to Ld(λ) in formulas (1) and (3).

In the example in FIG. 4D, a signal when passing from the point 50c on the object through the pupil area 30a is indicated by reference numeral 153, and a signal when passing from the point 50c on the object through the pupil area 30e is indicated by reference numeral 154. When focusing on the signals 153 and 154, image uniformity decreases due to the effect of mirror face reflected light. As described later with reference to FIGS. 5A to 5C, position matching of the signals 152a and 152e is performed using an outline or the like of the object not shown in FIG. 4D.

Luminance properties for view points described with reference to FIGS. 4A to 4D are used as approximate values of the BRDF. Preferably, a peak value of luminance from the same object is normalized as 1, and changes relative to changes in view point (changes in reflection angle) are considered. From here, a ratio of the diffuse reflection component and the mirror face reflection component in formula (3), and the constant n indicating glossiness of the mirror face reflection component, are determined. As a still simpler example, there is a method using template matching, and this is described later with reference to FIGS. 7A to 7C.

Figure 5A:
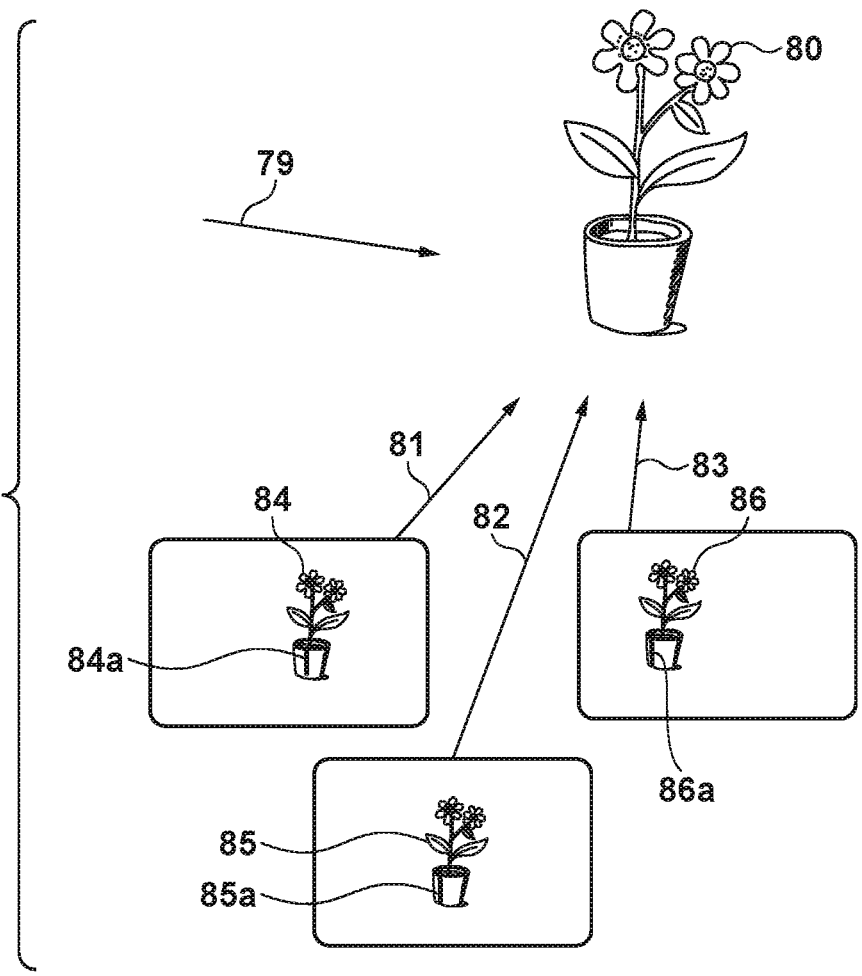
FIGS. 5A to 5C schematically show how a plurality of parallax images are acquired.

Specific operation of the correspondence point searching step S203 in FIG. 3B will be described with reference to FIGS. 5A to 5C. FIG. 5A schematically shows how a plurality of parallax images are acquired. Arrow 79 indicates a light ray from a light source, reference numeral 80 indicates an object, and arrows 81, 82, and 83 indicate directions from the view point of each parallax image. Reference numerals 84, 85, and 86 respectively indicate the object when viewed from the directions indicated by reference numerals 81, 82, and 83, and reference numerals 84a, 85a, and 86a respectively indicate positions of the mirror face reflection component on the object images 84, 85, and 86.

Figure 5B:
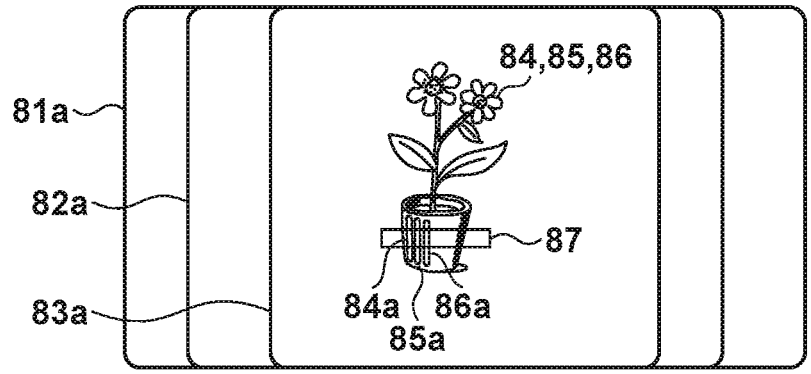

FIG. 5B schematically shows a state after performing position matching, and reference numeral 84 (reference numerals 85 and 86 are overlaid) indicates the object image in FIG. 5A. Also, reference numerals 84a, 85a, and 86a respectively indicate positions of the same mirror face reflection component as FIG. 5A, and reference numerals 81a, 82a, and 83a respectively indicate frames that schematically show position matching of images from the view points 81, 82, and 83. Reference numeral 87 indicates a frame schematically showing a partial area used in order to perform position matching.

Figure 5C:
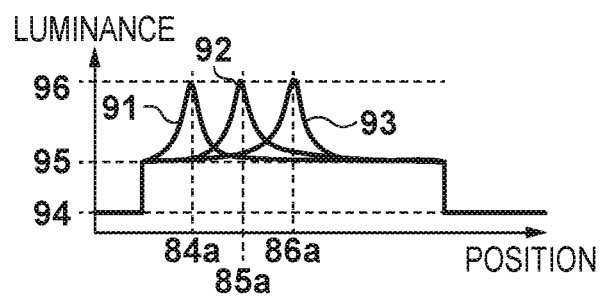

FIG. 5C schematically shows a luminance distribution within the frame 87 in the state of FIG. 5B. The position in the horizontal direction of FIG. 5B is shown on the horizontal axis in FIG. 5C, and luminance is shown on the vertical axis. In FIG. 5C, reference numerals 91, 92, and 93 respectively indicate graphs that indicate luminance of the objects 84, 85, and 86, reference numeral 94 indicates a background luminance level, reference numeral 95 indicates a diffuse reflection level of the object 80, and reference numeral 96 indicates a luminance level in which diffuse reflection and mirror face reflection are combined.

FIG. 5A shows shooting of the object 80 from three view points. Here, shooting from a plurality of view points is shown schematically, and using three view points does not have any special meaning. As described with reference to FIGS. 2A to 2C, in the optical system of the present embodiment, by performing the same exposure operation as a normal camera, it is possible to obtain a plurality of parallax images that were exposed at the same time. Also, in the example shown in FIGS. 2A to 2C, images of five view points are obtained. Further, in the camera system 100 of the present embodiment, it is possible to perform a plurality of instances of exposure over different times, and obtain a greater quantity of images having different parallaxes.

As shown in FIG. 5A, when shooting from the plurality of view points 81, 82, and 83, the same object 80 is formed at the different positions 84, 85, and 86 in the respective parallax images. As is known in principles of autofocus utilizing phase difference or principles of triangulation, the relative position of images of differing view points is determined according to the distance between view points and the distance to the object. In the camera system 100 disclosed in the present embodiment, from the configuration of the optical system and the signal of the inertial sensor 15 shown in FIG. 1, it is possible to know the relative positional relationship of a plurality of images of differing view points. FIG. 5A shows how images are formed offset in the horizontal direction.

By splicing out object images at an appropriate size and performing position matching such that the object images match, an image as shown in FIG. 5B is obtained. That is, the object images 84, 85, and 86 are overlaid, and conversely the frames 81a, 82a, and 83a indicating the image acquisition range are offset. A frame used for object position matching is schematically indicated by reference numeral 87. The luminance distribution within the frame 87 is as shown in FIG. 5C. Here, FIG. 5C shows a spread in one dimension, but this is related to an epipolar constraint. FIG. 5A shows image forming offset in the horizontal direction, and this means that parallax images such that parallax occurs only in the horizontal direction are used. If parallax images corresponding to the pupil areas 30a, 30c, and 30e are used, corresponding to the example in FIG. 2, there is parallax only in the x direction, resulting in the present example. In this case, offset of the object image does not occur in the vertical direction, so by adding a signal in a direction (the vertical direction in FIGS. 5A to 5C) orthogonal to the parallax direction, it is possible to treat an image as if there is spread in one dimension. By adopting such a configuration, it is possible to perform position matching with a reduced amount of computation, and improved S/N ratio of signals.

The signals 91, 92, and 93 of the objects 84, 85, and 86 shown in FIG. 5C have a low degree of image matching in the areas 84a, 85a, and 86a, which include intense mirror face reflection. Note that the degree of image matching mentioned here refers to a sum of difference absolute values after performing position matching of two images, and refers to the size of a portion that is not overlaid when comparing two images in FIGS. 5A to 5C. On the other hand, images are extremely well matched in a nearby portion or at an edge of the object 80.

In a case where effects due to mirror face reflection are not dominant, as shown in FIG. 5C, the objects 84, 85, and 86 are position-matched using an object edge. If the size of the frame 87 used for position matching of the object is appropriately set, it is possible to avoid a reduction in position matching accuracy due to drag of the mirror face reflection component.

According to the correspondence point search described with reference to FIGS. 5A to 5C, effects of the mirror face reflection component are reduced, so it is possible to detect pixels that correspond to the same point of an object. With a similar meaning, it is possible to detect the offset amount of images corresponding to the same object in the parallax direction.

Figure 6A:
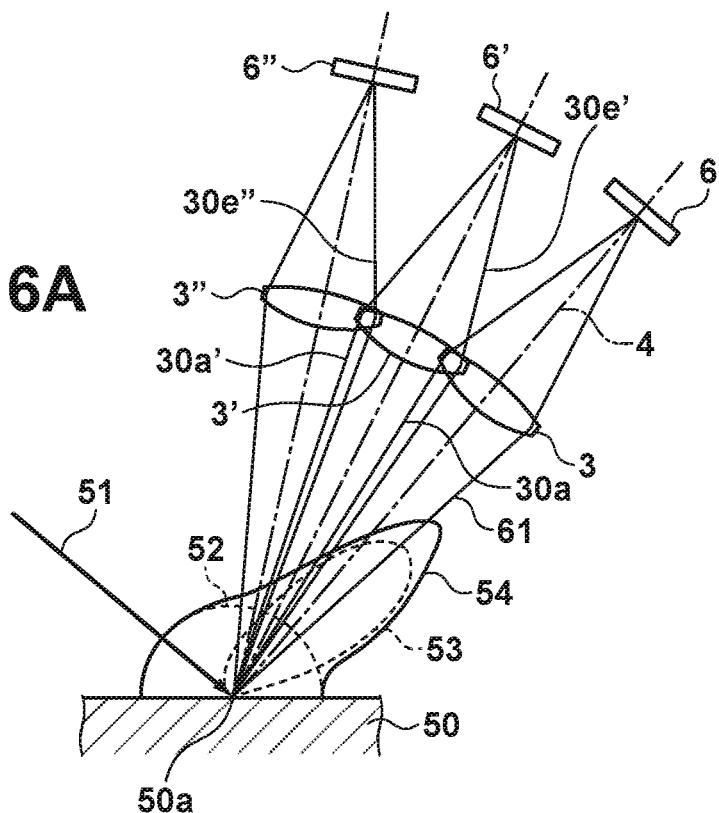
FIGS. 6A to 6D illustrate image acquisition, distance calculation, and segmentation in one embodiment.
Figure 6B:
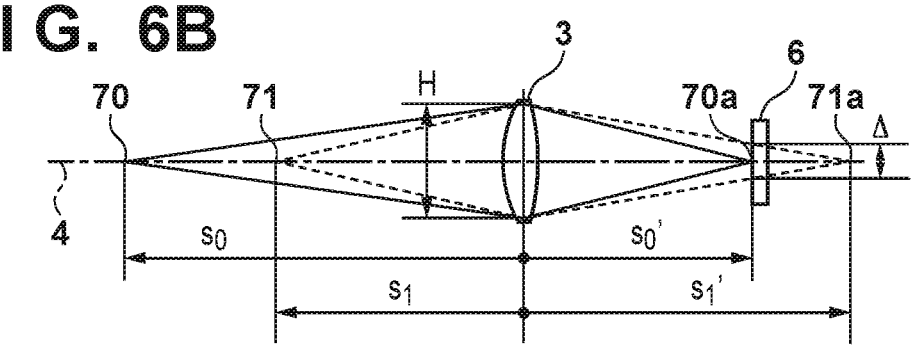
Figure 6C:
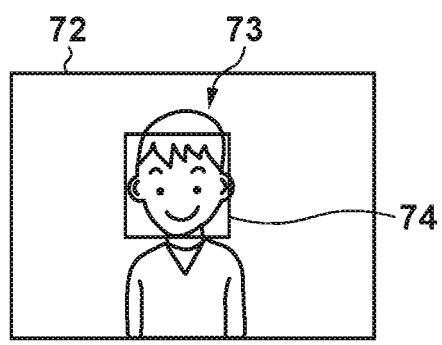

Image acquisition, distance conversion, and segmentation will be described with reference to FIGS. 6A to 6D. FIG. 6A illustrates an acquisition method in a case where a plurality of instances of exposure are performed over different times in the image acquisition. FIG. 6B specifically illustrates distance conversion. FIG. 6C schematically shows segmentation.

FIG. 6A illustrates the image acquisition of step S104 in FIG. 3A, and specifically illustrates a case where a plurality of instances of exposure are performed over different times. Reference numerals in FIG. 6A are based on the reference numerals in FIGS. 4A to 4D, and the same reference numerals are assigned to the same items. FIG. 6A differs from FIGS. 4A to 4D in that, because a plurality of images are acquired while moving, a plurality of the imaging optical system 3 and the image sensor 6 provided in the camera system 100 are depicted. A ' symbol is affixed at each instance of moving and performing exposure. That is, in the case of the imaging optical system 3, exposure is performed in a sequence from 3 to 3' to 3".

FIG. 6A depicts performing acquisition such that, in two images adjacent in time, at least one view point overlaps. That is, the endmost luminous flux 30a when the imaging optical system is in the position of reference numeral 3, and a luminous flux 30e' of the opposite end when the imaging optical system is in the position of reference numeral 3', which is the next time, overlap. Likewise, a luminous flux 30a' and a luminous flux 30e" also overlap. The width of luminous flux (width of the luminous flux 30a and the luminous flux 30e) incorporated from the conditions of the imaging optical system is known, so control is preferably performed such that, while referring to the signal of the inertial sensor 15 shown in FIGS. 1A and 1B, the next instance of exposure is performed before exceeding this width. By acquiring images as shown in FIG. 6A, it is possible to perform acquisition with sufficient density of light rays.

FIG. 6B illustrates the distance conversion of step S204 in FIG. 3B. In FIG. 6B, reference numerals 3, 4, and 6 respectively indicate the imaging optical system, the optical axis, and the image sensor as in FIGS. 1A and 1B, reference numerals 70 and 71 indicate positions where the object exists, and reference numerals 70a and 71a respectively indicate positions coupled to the objects 70 and 71 by the imaging optical system 3. Here, distances from the main point of the imaging optical system 3 to each of the objects 70 and 71 and the coupling points 70a and 71a are represented by reference signs S0, S1, S0', and S1'. Also, a distance in the parallax direction of images used when performing the correspondence point search in step S203 is represented by H, and the offset amount of the images in the detected imaging plane is represented by Δ.

The correspondence point search corresponding to step S203 in FIG. 3B will be described with reference to FIGS. 5A to 5C. Using this information and information of the imaging optical system, the distance to the object is calculated. First, information (such as distance of an object face coupled to the image sensor 6) of the imaging optical system is obtained by communicating with the lens unit 2. The following formulas are satisfied by the image forming formula.

$$1/S0' = 1/S0 + 1/f \qquad (4)$$

$$1/S1' = 1/S1 + 1/f \qquad (5)$$

Here, from a triangle similarity relationship:

$$S1':S0' = H:(H-\Delta) \qquad (6)$$

Among these, S0 and S0' are already known from the above-described focus state. Also, f, H, and Δ also are already known, so when S1' is expressed using already known values from formulas (4) and (6), $$S1'=HfS0'/\{(H-\Delta)f-HS0'\} \quad (7)$$

Further, using formula (5), it is possible to obtain the distance to the object. Thus, it is possible to calculate the distance to the object.

Figure 6D:
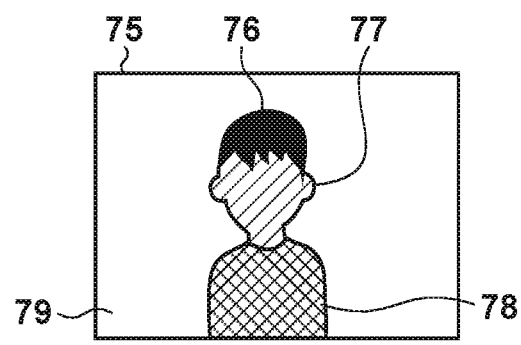

FIGS. 6C and 6D illustrate the segmentation of step S302 in FIG. 3C. In FIG. 6C, reference numeral 72 indicates an image that was shot, reference numeral 73 indicates an object, and reference numeral 74 indicates a detection frame of face detection. In FIG. 6D, reference numeral 75 indicates an image after segmentation, and reference numerals 76, 77, 78, and 79 respectively indicate divided areas.

In the example shown in FIGS. 6C and 6D, for ease of understanding the description, a circumstance is presumed in which only the object 73 exists within a screen, and the background is flat. In the example shown in FIG. 6C, a face of a person is detected. In FIG. 6D, the image is divided into a plurality of areas using object distance, color information, and the like. Segmentation is well-known as a graph cut in image processing, and some of that technology is preferably utilized. In FIG. 6D, the image is divided into four areas, specifically a hair area 76, a facial skin area 77, a clothes area 78, and a background area 79. The area 77 corresponding to face detection is highly likely to be skin of a person, so properties of skin of a person may be conferred, while omitting detection of reflectance properties (step S303 in FIG. 3C) or template matching of material appearance (step S304 in FIG. 3C).

Figure 7A:
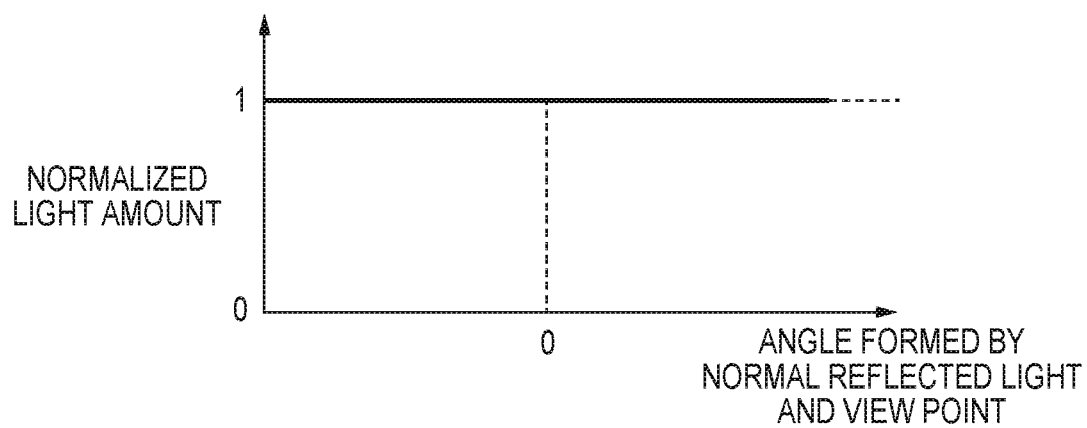
FIGS. 7A to 7C illustrate template matching of reflectance properties.
Figure 7B:
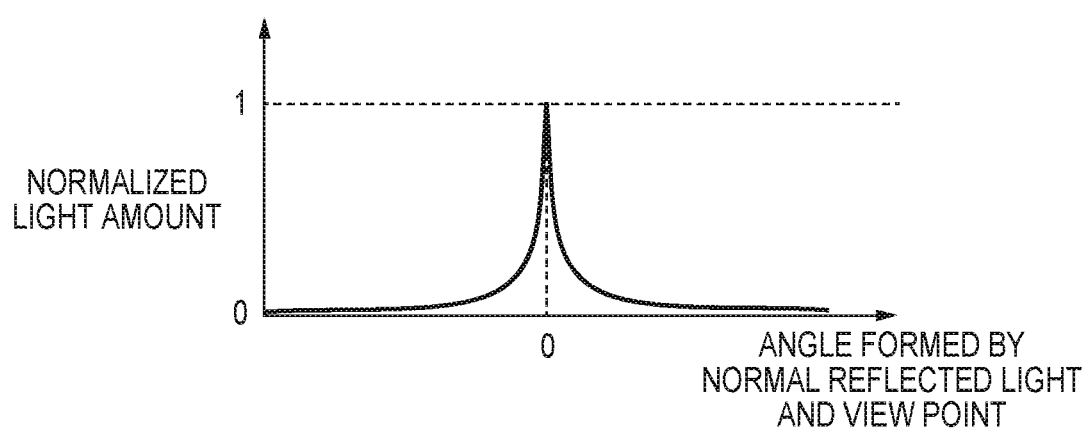
Figure 7C:
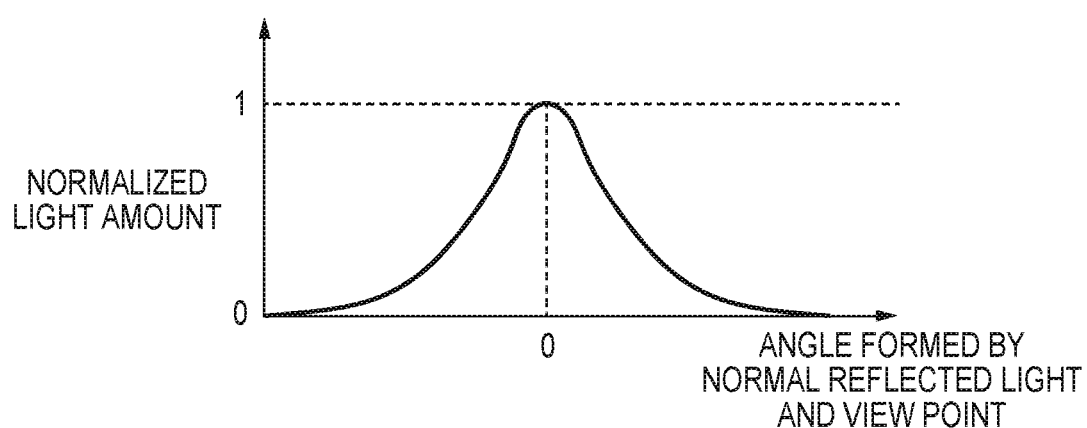

FIGS. 7A to 7C illustrate operation related to the template matching of step S304 in FIG. 3C. FIGS. 7A, 7B, and 7C are graphs showing examples of reflectance properties, and in each of these drawings, a normalized light amount (a light amount with a peak value of luminance from the same object normalized as 1) is shown on the vertical axis, and an angle formed by normal reflected light and a view point is shown on the horizontal axis. However, in the camera system 100 of the present embodiment, the direction of illuminating light is not known, so the position where luminance from the same object becomes a peak value is set to 0, and a relative position from there is shown on the horizontal axis. For example, in the example of FIG. 5C, a relative angle is plotted with the positions of areas 84a, 85a, and 86a respectively set to 0.

FIG. 7A shows reflectance properties of a matte face, FIG. 7B shows reflectance properties of a face in a state near a mirror face, and FIG. 7C shows reflectance properties of a face having properties between those of FIGS. 7A and 7B. The camera system 100 of the present embodiment is provided in advance with reflectance properties of many existing objects as a database in a memory.

Using the camera system 100 of the present embodiment, as described with reference to FIGS. 4A to 4D and FIGS. 5A to 5C, it is possible to obtain reflectance properties as shown in FIG. 4D or FIG. 5C. Preferably, these properties are compared to the database shown in FIGS. 7A to 7C, and most similar properties are used as material appearance information of that area. As is clear from formulas (1) to (3), there is a particularly large change in the vicinity where the angle formed by normal reflected light and the view point is 0 degrees. If information in this vicinity is obtained, preferably other locations are estimated and similar properties are adapted. If many objects are covered by the databases in FIGS. 7A to 7C, it is possible to express the material appearance of many objects shot normally, while compressing data.

Next, a 3D printing system using the camera system 100 of the present embodiment will be described with reference to FIGS. 8A to 8E. FIG. 8A illustrates the configuration of the 3D printing system. FIG. 8B shows a perspective view of an object that is shaped, and FIGS. 8C, 8D, and 8E respectively show shaping states of a 3D printer. In FIG. 8A, reference numeral 105 indicates a personal computer (PC), and reference numeral 110 indicates a 3D printer. In FIGS. 8B to 8D, reference numeral 120 indicates an object that is shaped, reference numerals 120a and 120b indicate an upper face of the object 120, and reference numeral 121 indicates a support material when performing shaping. As shown in FIG. 8A, information acquired by the camera system 100 is sent to the 3D printer 110 through the PC 105. In the PC 105, format conversion, or instructions by a user when shaping, are performed. Also, in a case where information related to the 3D printer is acquired from outside in step S102 in FIG. 3A, the camera system 100 outputs a request to send a printer ID indicating a printer classification or specification information to the PC 105, or to the 3D printer 110 through the PC 105. The PC 105 receives the send request, and sends information related to the 3D printer 110 that is stored in a memory or was received from the 3D printer 110, to the camera system 100 through a communication interface.

Consider a scene in which information of a button, which is the object shown in FIG. 8B, is acquired and shaped with the 3D printer 110. A front face on top of the object 120 is indicated by reference numeral 120a, and a back face is indicated by reference numeral 120b. FIGS. 8C to 8E are cross-sectional views for illustrating shaping states. In FIG. 8C, the object is formed such that the support material is not layered on the front face 120a. In FIG. 8D, the object is formed such that the support material contacts the entire face of the object. In FIG. 8E, the object shaping direction is reversed from FIGS. 8C and 8D, and then the object is formed such that the support material is not layered on the back face 120b of the object.

By adopting such a configuration, in FIG. 8D the entire face is a matte face, in FIG. 8C the front face 120a is a glossy face and other faces are matte faces, and in FIG. 8E the back face 120b is a glossy face and other faces are matte faces. That is, by changing the shaping direction and the support material layering state, it is possible to express a defined material appearance. In the method described with reference to FIGS. 8A to 8E, the material appearance is expressed using the support material, but a method other than support material (for example, changing a resin type used in shaping, or changing a coating material during shaping), or the like may also be used.

When the user has instructed to perform shaping with priority given to material appearance (step S405 in FIG. 3D), preferably, information obtained by the camera system 100 is referred to, and in a case where the front face of the object 120 is glossy, a shaping method as shown in FIG. 8C is selected. According to the method described with reference to FIGS. 8A to 8E, it is possible to express material appearance using an arbitrary (freely selectable) shaping method.

As described above, according to the above embodiment, it is possible to provide a camera system that, with a simple configuration, is capable of acquiring material appearance information of an object, and possible to provide a printing system including the camera system.

In the above-described embodiment, the images acquired in step S104 are acquired from the imaging optical system 3 and the image sensor 6 shown in FIGS. 1A and 1B and FIGS. 2A to 2C, but this is not a limitation. Any configuration may be adopted in which it is possible to acquire information related to intensity of light from an object and information related to angle (so-called light field data) as the information, and for example, as disclosed in Japanese Patent Laid-Open No. 2011-22796, a configuration may also be adopted in which a plurality of cameras from differing view points collectively serve as an image capturing unit. Also, unlike the image sensor 6 in FIGS. 2A to 2C, a configuration may also be adopted in which, such that the object plane and the image sensor 6 have a coupling relationship, luminous flux from the imaging optical system 3 is formed in an image on the microlens array, and the image sensor 6 is provided on that image forming plane. Further, a configuration may also be adopted in which luminous flux from the imaging optical system 3 is re-formed (luminous flux that was once formed as an image but is in a diffuse state is formed as an image, so this is called re-forming) as an image on the microlens array, and the image sensor 6 is provided on that image forming plane. Also, a method can be used in which a mask (a gain modulation element) to which an appropriate pattern has been applied is inserted into the optical path of the imaging optical system 3. Further, it is not absolutely necessary to obtain images in one instance of exposing by an image capturing unit as described above, and the present invention can also be achieved using a plurality of images obtained by performing image capturing across a plurality of locations of the depth of field or focus position using a conventional image capturing unit. In this case, for example as disclosed in Japanese Patent Laid-Open No. 2014-155008, it is possible to convert from a plurality of obtained images to a state of light field data obtained from the image sensor 6 in FIGS. 2A to 2C, and use this data. Further, as another acquisition method, there is a method in which images are acquired while moving the camera. That is, a plurality of images may be acquired at each of the positions 6, 6', and 6" shown in FIG. 6A. It is also possible to convert from these images to a state of light field data, and use this data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-211106, filed Oct. 27, 2015 and 2016-184688, filed Sep. 21, 2016, which are hereby incorporated by reference herein in their entirety.

What is claimed is:

1. An image processing apparatus comprising:
at least one processor or circuit configured to perform the operations of a plurality of units comprising:
(1) a first acquiring unit configured to acquire a plurality of sets of images captured by an image capturing unit at a respective plurality of different positions of an imaging optical system of the image capturing unit, wherein each set of images are images captured at one time, wherein the plurality of sets of images are acquired while moving the image capturing unit such that a position of at least one part of the imaging optical system when capturing a first one of two sets of images adjacent in time overlaps a position of the at least one part of the imaging optical system when capturing a second one of the two sets of images adjacent in time, wherein the plurality of sets of images includes the two sets of images adjacent in time;
(2) a second acquiring unit configured to acquire shape information of an object based on the images acquired by the first acquiring unit;
(3) a third acquiring unit configured to acquire material appearance information indicating reflectance properties and opacity of the object based on a diffusion component and a regular reflection component of the object obtainable from the images acquired by the first acquiring unit; and
(4) a generating unit configured to generate a file including (a) the images, (b) the shape information of the object, and (c) the material appearance information of the object, acquired by the first to third acquiring units.

2. The image processing apparatus according to claim 1, wherein the second acquiring unit further acquires color information of the object.

3. The image processing apparatus according to claim 1, wherein the file includes metadata, and the metadata includes a thumbnail image.

4. The image processing apparatus according to claim 1, wherein the file includes metadata, and the metadata includes information related to a 3D printer.

5. The image processing apparatus according to claim 1, wherein the file includes the images as RAW data, and includes the shape information of the object and the material appearance information of the object as metadata.

6. The image processing apparatus according to claim 1, wherein the at least one processor or circuit is configured to further perform the operations of a recording unit configured to record the file generated by the generating unit.

7. The image processing apparatus according to claim 6, wherein the recording unit records the shape information of the object and the material appearance information of the object for each single voxel composed of distances in a predetermined width direction, a predetermined height direction, and a predetermined depth direction in the images.

8. The image processing apparatus according to claim 6, wherein the recording unit selects and records information having a high degree of matching with a pattern that was set in advance as the material appearance information.

9. The image processing apparatus according to claim 6, wherein the recording unit records, as metadata of the file, information corresponding to a main object among the material appearance information.

10. The image processing apparatus according to claim 1, wherein the at least one processor or circuit is configured to further perform the operations of a designation unit configured to designate whether or not to acquire the material appearance information of the object with the third acquiring unit.

11. The image processing apparatus according to claim 10, wherein the designation unit designates whether or not to acquire the material appearance information of the object based on properties of a printer to perform 3D printing based on information recorded by the recording unit.

12. The image processing apparatus according to claim 1, wherein the material appearance information is information of reflectance properties of the object.

13. The image processing apparatus according to claim 12, wherein the material appearance information is a BRDF (Bidirectional Reflectance Distribution Function) of the object.

14. The image processing apparatus according to claim 1, wherein the at least one processor or circuit is configured to further perform the operations of a face detection unit configured to detect a face existing in the images, and predetermined material appearance information being conferred for an area determined to be a face by the face detection unit.

15. The image processing apparatus according to claim 1, wherein the third acquiring unit acquires the material appearance information of the object based on a direction of reflection of reflected light from the object and intensity of the reflection.

16. A 3D printing system comprising:
(A) an image processing apparatus comprising:
at least one processor or circuit configured to perform the operations of a plurality of units comprising:
(1) a first acquiring unit configured to acquire a plurality of sets of images captured by an image capturing unit at a respective plurality of different positions of an imaging optical system of the image capturing unit, wherein each set of images are images captured at one time, wherein the plurality of sets of images are acquired while moving the image capturing unit such that a position of at least one part of the imaging optical system when capturing a first one of two sets of images adjacent in time overlaps a position of the at least one part of the imaging optical system when capturing a second one of the two sets of images adjacent in time, wherein the plurality of sets of images includes the two sets of images adjacent in time;
(2) a second acquiring unit configured to acquire shape information of an object based on the images acquired by the first acquiring unit,
(3) a third acquiring unit configured to acquire material appearance information indicating reflectance properties and opacity of the object based on a diffusion component and a regular reflection component of the object obtainable from the images acquired by the first acquiring unit, and
(4) a generating unit configured to generate a file including (a) the images, (b) the shape information of the object, and (c) the material appearance information of the object, acquired by the first to third acquiring units; and
(B) a 3D printer configured to perform printing based on information obtained from the image processing apparatus.

17. The 3D printing system according to claim 16, wherein the first acquiring unit acquires information related to the 3D printer prior to acquiring an image.

18. The 3D printing system according to claim 17, wherein the 3D printer sends out the information related to the 3D printer in response to a request from the first acquiring unit.

19. The 3D printing system according to claim 16, wherein the 3D printer specifies a printing method and performs printing according to a classification of the first acquiring unit.

20. An image processing method comprising:
by a first acquiring unit, firstly acquiring a plurality of sets of images captured by an image capturing unit at a respective plurality of different positions of an imaging optical system of the image capturing unit, wherein each set of images are images captured at one time, wherein the plurality of sets of images are acquired while moving the image capturing unit such that a position of at least one part of the imaging optical system when capturing a first one of two sets of images adjacent in time overlaps a position of the at least one part of the imaging optical system when capturing a second one of the two sets of images adjacent in time, wherein the plurality of sets of images includes the two sets of images adjacent in time;
by a second acquiring unit, secondly acquiring shape information of an object based on the images acquired by the first acquiring;
by a third acquiring unit, thirdly acquiring material appearance information indicating reflectance properties and opacity of the object based on a diffusion component and a regular reflection component of the object obtainable from the images acquired by the first acquiring; and
by a generating unit, generating a file including (a) the images, (b) the shape information of the object, and (c) the material appearance information of the object, acquired in the first to third acquiring.

21. A non-transitory computer-readable storage medium storing a computer program for causing a computer to execute each step of an image processing method, the image processing method comprising:
by a first acquiring unit, firstly acquiring a plurality of sets of images captured by an image capturing unit at a respective plurality of different positions of an imaging optical system of the image capturing unit, wherein each set of images are images captured at one time, wherein the plurality of sets of images are acquired while moving the image capturing unit such that a position of at least one part of the imaging optical system when capturing a first one of two sets of images adjacent in time overlaps a position of the at least one part of the imaging optical system when capturing a second one of the two sets of images adjacent in time, wherein the plurality of sets of images includes the two sets of images adjacent in time;
by a second acquiring unit, secondly acquiring shape information of an object based on the images acquired by the first acquiring;

by a third acquiring unit, thirdly acquiring material appearance information indicating reflectance properties and opacity of the object based on a diffusion component and a regular reflection component of the object obtainable from the images acquired by the first acquiring; and by a generating unit, generating a file including (a) the images, (b) the shape information of the object, and (c) the material appearance information of the object, acquired in the first to third acquiring.

* * * * *